(12) United States Patent
Bianchi et al.

(10) Patent No.: US 11,703,117 B2
(45) Date of Patent: Jul. 18, 2023

(54) HOVER-CAPABLE AIRCRAFT

(71) Applicant: LEONARDO S.P.A., Rome (IT)

(72) Inventors: Andrea Bianchi, Samarate (IT); Sergio Sartori, Samarate (IT)

(73) Assignee: LEONARDO S.P.A., Rome (IT)

( * ) Notice: Subject to any disclaimer, the term of this patent is extended or adjusted under 35 U.S.C. 154(b) by 175 days.

(21) Appl. No.: 17/294,540

(22) PCT Filed: Sep. 30, 2019

(86) PCT No.: PCT/IB2019/058287
§ 371 (c)(1),
(2) Date: May 17, 2021

(87) PCT Pub. No.: WO2020/109879
PCT Pub. Date: Jun. 4, 2020

(65) Prior Publication Data
US 2021/0404547 A1 Dec. 30, 2021

(30) Foreign Application Priority Data

Nov. 28, 2018 (EP) ..................................... 18208981

(51) Int. Cl.
| | |
|---|---|
| *F16H 57/08* | (2006.01) |
| *B64C 27/12* | (2006.01) |
| *F16C 19/38* | (2006.01) |
| *F16C 23/08* | (2006.01) |
| *F16C 33/58* | (2006.01) |
| *F16H 1/28* | (2006.01) |

(52) U.S. Cl.
CPC ............. *F16H 57/08* (2013.01); *B64C 27/12* (2013.01); *F16C 19/38* (2013.01); *F16C 23/086* (2013.01); *F16C 33/581* (2013.01); *F16H 1/28* (2013.01); *F16C 2326/43* (2013.01)

(58) Field of Classification Search
CPC .. F16H 57/08; F16H 1/28; F16C 19/38; F16C 23/086; F16C 33/581
See application file for complete search history.

(56) References Cited

U.S. PATENT DOCUMENTS 7,861,411 B2 * 1/2011 Lunin ..................... F16H 55/06
  29/446
10,113,633 B2 * 10/2018 Niergarth ................ F16C 19/28

FOREIGN PATENT DOCUMENTS

| EP | 2 551 550 | 1/2013 | |
|---|---|---|---|
| EP | 3064802 A1 * | 9/2016 | ............. B64C 27/12 |
| FR | 3062692 A1 * | 8/2018 | ............. F16C 19/38 |
| FR | 3 065 267 | 10/2018 | |
| GB | 2 448 992 | 11/2008 | |

* cited by examiner

*Primary Examiner* — Derek D Knight
(74) *Attorney, Agent, or Firm* — Leason Ellis LLP

(57) ABSTRACT

A hover-capable aircraft is described that comprises a drive unit, a rotor and a transmission interposed between the drive unit and the rotor; the transmission comprises a gear; the gear, in turn, comprises a main body rotatable about a first axis and a plurality of first teeth projecting in a cantilever fashion from the main body; the gear comprises a first pair of first rings axially opposite to each other and cooperating with the gear so as to exert a radial force on the gear.

12 Claims, 4 Drawing Sheets

![US 11,703,117 B2]

HOVER-CAPABLE AIRCRAFT

CROSS-REFERENCE TO RELATED APPLICATIONS

This patent application is a U.S. National Phase Application under 35 U.S.C. § 371 of International Patent Application No. PCT/IB2019/058287, filed on Sep. 30, 2019, which claims priority from European patent application no. 18208981.3 filed on Nov. 28, 2018 all of which are incorporated by reference, as if expressly set forth in their respective entireties herein.

TECHNICAL FIELD

The present invention relates to a hover-capable aircraft, for example a helicopter, a convertiplane, or a gyrodyne.

BACKGROUND ART

As is known, helicopters are normally equipped with transmissions adapted to transmit motion from one or more turbines to the main and/or tail rotors, and/or from the turbine to a plurality of ancillary devices, i.e. devices intended, for example, to provide the necessary power for the operation of onboard equipment.

Such mechanical transmissions generally employ one or more epicyclical type stages inside the reduction train, adapted to transmit power with adequate torque value and rotational speed to the main rotor's drive shaft.

In its simplest form, such an epicyclic gear train reducer basically comprises:
 a first gear, called the sun gear, which is rotatable about a first fixed axis;
 a second fixed gear, called the ring gear, which has a second axis coincident with the first axis; and
 a plurality of gears, called planet gears, which mesh with the sun gear and the ring gear and are rotatable about respective third movable axes.

The epicyclic trains also comprise a planet-gear carrier, which is rotatable about the first axis and is connected to the planet gears.

More specifically, the planet gears are rotatable about respective third axes associated with respective pins of the planet-gear carrier and describe a revolutionary movement around the first axis integrally with the planet-gear carrier.

The relative rotation between the planet gears and pins of the planet-gear carrier is enabled by respective rolling bodies, which roll on a raceway defined integrally by the planet gears.

In a solution of known type, mechanical power enters the epicyclic train via the sun gear and is transmitted, with the correct torque and rotational speed, to the rotor shaft via the planet-gear carrier.

During the helicopter's operational life, the planet gears are subjected to fatigue stress due to the meshing and Hertzian contact with the sun gear and the ring gear. The planet gears are also subjected to additional fatigue stress due to Hertzian contact with the aforementioned rolling bodies.

Moreover, the generation of cracks is facilitated in that the face width of the planet gears must necessarily be reduced in order to contain the overall weight of the transmission and, consequently, of the entire aircraft.

The propagation of such cracks might cause one of the planet gears to break into a number of separate pieces.

Such breakage would cause detachment of the separate planet gear pieces from the transmission, which might then be accelerated inside the transmission.

The risk would thus arise of the separate planet gear pieces being projected inside the transmission and possibly jamming in a position interfering with the other gears of the transmission, preventing correct movement of these other gears.

In certain situations, this could result in the risk of the transmission seizing up, and the transmission's consequent loss of functionality.

This loss of functionality would clearly engender the risk of losing the helicopter and place the safety of the helicopter's passengers at risk.

There is awareness in the industry of the need to reduce as far as possible the risk of detachment of the gears, in particular the planet gears, of the transmission of a hover-capable aircraft.

EP-A-2551550 describes a transmission of a known type for a hover-capable aircraft.

DISCLOSURE OF INVENTION

The object of the present invention is to produce an aircraft that enables satisfying at least one of the above-described needs in a simple and inexpensive manner.

The aforementioned object is achieved by a hover-capable aircraft as claimed in claim 1.

BRIEF DESCRIPTION OF THE DRAWINGS

For a better understanding of the present invention a preferred embodiment is described hereinafter, by way of non-limitative example and with reference to the accompanying drawings, in which.

BEST MODE FOR CARRYING OUT THE INVENTION

Figure 1:
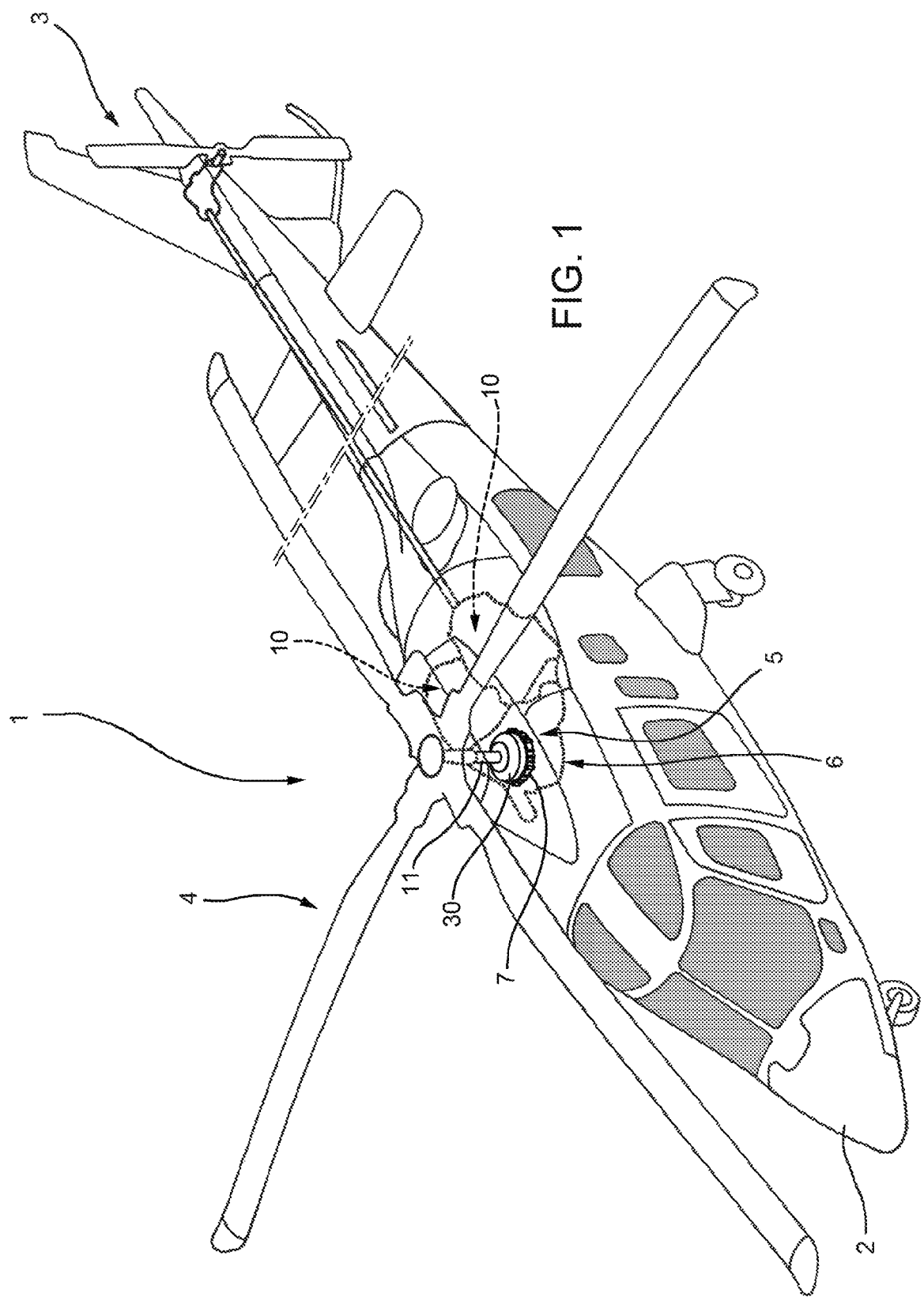
FIG. 1 shows a hover-capable aircraft, in particular a helicopter, made according to the present invention.
Figure 2:
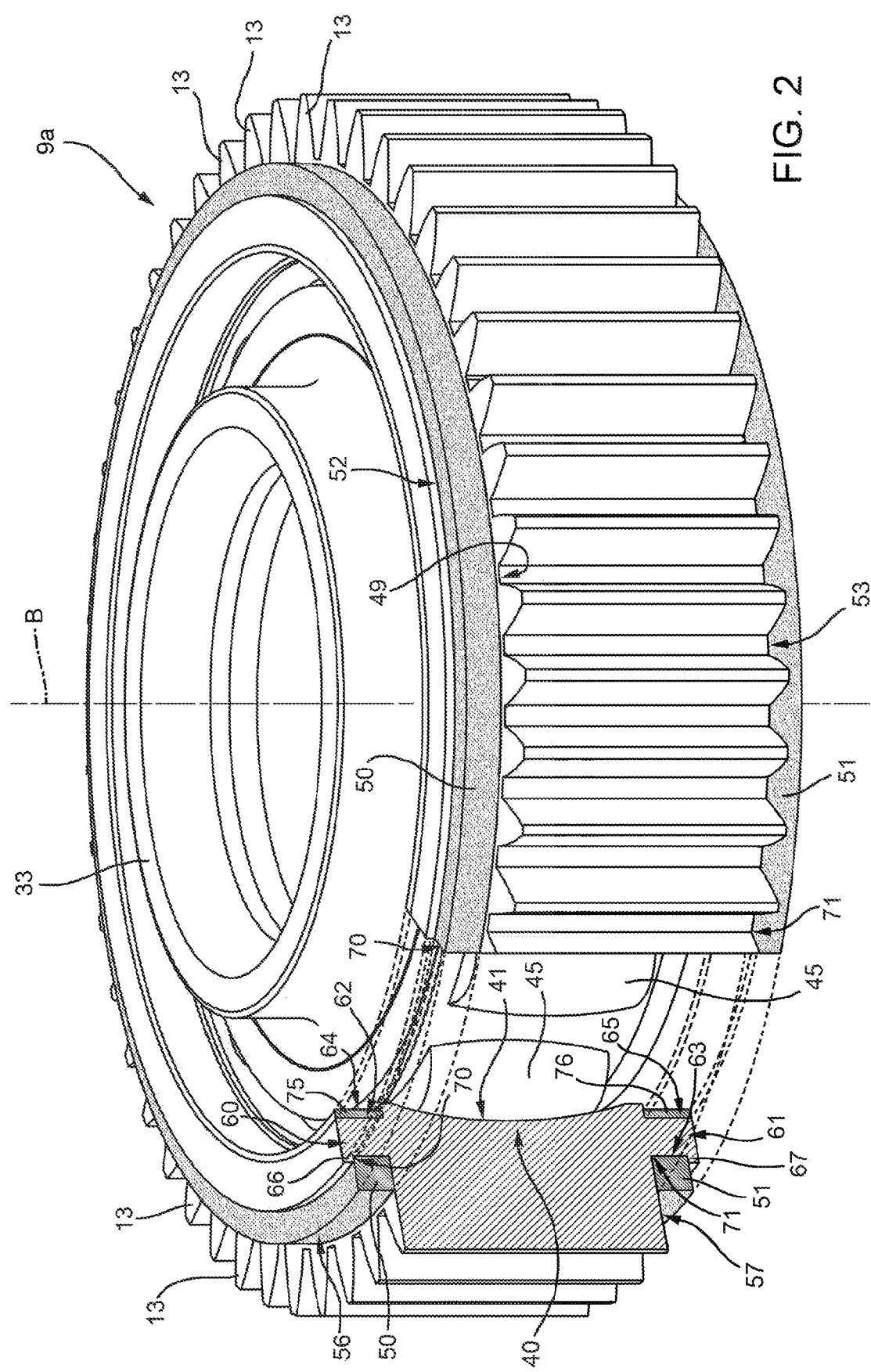
FIG. 2 shows a perspective view, on a quite enlarged scale, of a gear of a transmission implemented on the helicopter of FIG. 1.

Referring to FIG. 1, reference numeral 1 indicates a hover-capable aircraft, a helicopter in the case shown.

The helicopter 1 basically comprises a fuselage 2, a main rotor 4 mounted on the fuselage 2 and rotatable in a first plane to generate lift for the entire helicopter, and a tail rotor 3 located at an end of the fuselage 2. In particular, the tail rotor 3 is rotatable in a second plane transversal to the first plane to counter the rotational torque generated on the fuselage 2 by the main rotor 4.

The helicopter 1 further comprises a main transmission 5 adapted to transmit motion from one or more turbines 10 (only schematically shown) to a drive shaft 11 (only schematically shown in FIG. 1) of the rotor 4 and an auxiliary transmission unit, driven by the transmission 5 and driving the rotor 3.

The transmission 5 further comprises a final stage basically formed by an epicyclic train 6 (FIG. 3), which transmits power to the shaft 11 of the main rotor 4 with the correct torque value and angular speed.

In the case shown, the epicyclic train 6 is a reducing epyclic train.

Figure 3:
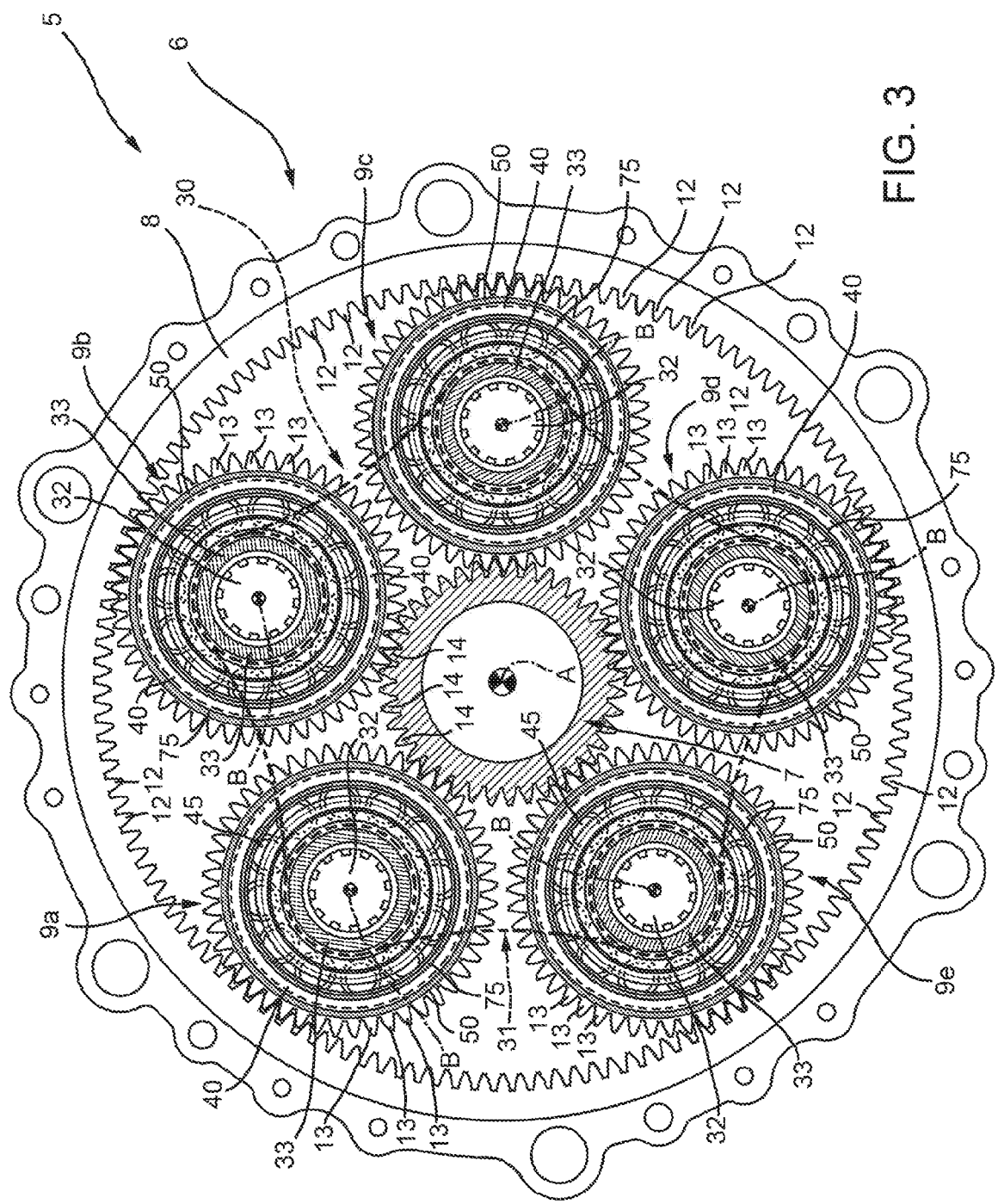
FIG. 3 is a cross-section of an epicyclic train of the transmission implemented on the helicopter of FIG. 1.

With particular reference to FIG. 3, the epicyclic train 6 basically comprises:

- a sun gear 7 comprising a plurality of teeth 14, rotatable about an axis A and operatively connected to an input shaft (not shown) of the stage 6;
- a ring gear 8, angularly fixed with respect to the axis A, comprising a plurality of teeth 12 and extending around axis A; and
- a plurality of gears performing the function of respective planet gears 9a, 9b, 9c, 9d and 9e and comprising respective pluralities of teeth 13, rotatable about respective axes B parallel to axis A, and meshing with the sun gear 7 and the ring gear 8.

In the case shown, the ring gear 8 has a larger diameter than the sun gear 7.

The epicyclic train 6 further comprises a planet-gear carrier 30 (schematically indicated in FIG. 3) rotatable about the axis A, connected directly to the drive shaft 11 of the rotor 4, and connected to the planet gears 9a, 9b, 9c, 9d and 9e.

In particular, each planet gear 9a, 9b, 9c, 9d and 9e rotates about its own axis B with respect to the planet-gear carrier 30 and describes a revolutionary movement around axis A with the planet-gear carrier 30.

Moreover, mechanical power enters the epicyclic train 6 via the sun gear 7 and is output, with the correct torque value and rotational speed, to the drive shaft 11 of the rotor 4 via the planet-gear carrier 30.

In particular, the planet-gear carrier 30 in turn comprises (FIG. 3):

- a planar element 31 rotatable about axis A;
- a plurality of pins 32 projecting in a cantilever fashion from the planar element 31 along respective axes B and on which respective planet gears 9a, 9b, 9c, 9d and 9e are mounted to rotate about the respective axes B; and
- a plurality of tubular elements 33 fitted on respective pins 32.

As all the planet gears 9a, 9b, 9c, 9d and 9e are identical, reference shall only be made to the planet gear 9a in the description below.

Similarly, as the pins 32 and tubular elements 33 are identical, reference shall only be made to a single pin 32 and to the corresponding tubular element 33 in the description below.

Referring to FIGS. 2 to 5, the planet gear 9a comprises a hollow body 40 from which teeth 13 radially project in a cantilever fashion, in a radial position with respect to axis A.

Furthermore, the body 40 is delimited in a radially innermost position, by a raceway 41 that is radially opposite to the teeth 13.

In the case shown, the raceway 41 is integrally defined by the body 40.

In the case shown, the raceway 41 is a concave surface.

The pin 32 and the tubular element 33 extend inside the body 40. The tubular element 33 defines, on the opposite radially outermost side to axis B, a raceway 43 radially facing the raceway 41.

The epicyclic train 6 further comprises a plurality of rolling bodies 45 interposed between each raceway 41 and the relative raceway 43.

In other words, the raceways 41 and 43 and the rolling bodies 45 define a rolling-contact bearing adapted to support the gear 9a on the respective pin 32 in a rotatable manner about axis B.

The radially outer ring of this rolling-contact bearing is defined by the raceway 41, which in turn is integrally defined by the body 40 of the planet gear 9a.

Similarly, the radially inner ring of this bearing is defined by the raceway 43, which in turn is defined by the tubular element 33 of the planet-gear carrier 30.

Figure 4:
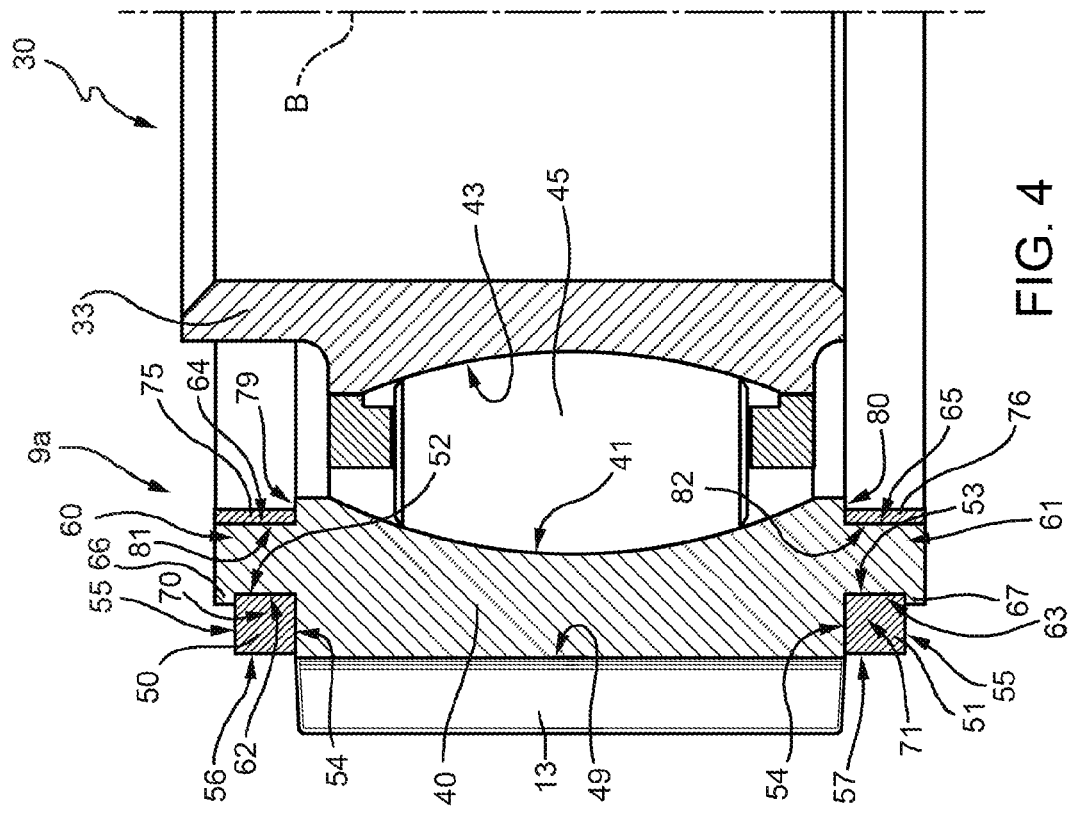
FIG. 4 is a section view, on a highly enlarged scale, of a detail of FIG. 2 in a first constructional solution.

In the case shown in FIG. 4, the bodies 45 are symmetrical spherical rollers coaxial to the axis B, and the raceway 43 is concave.

Figure 5:
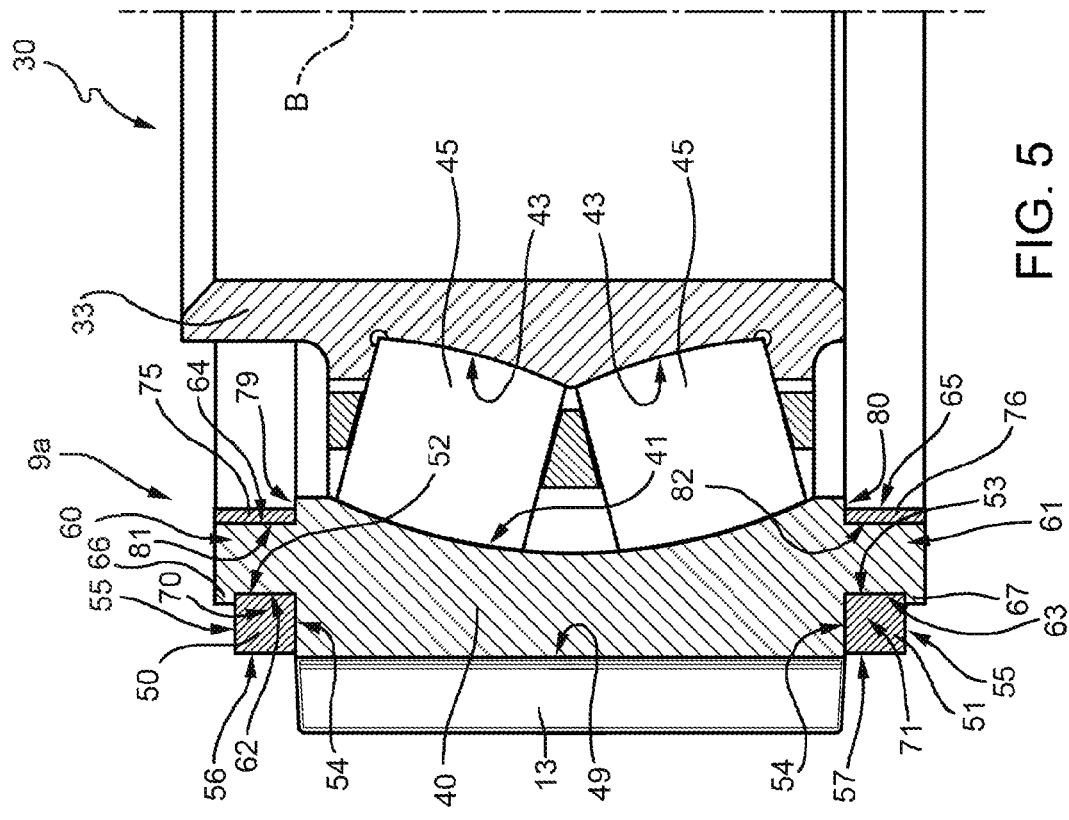
FIG. 5 is a section view, on a highly enlarged scale, of a detail of FIG. 2 in a second constructional solution.

In the case shown in FIG. 5, the rolling bodies 45 are self-aligning double row rollers that have their respective axes inclined with respect to axis B. Furthermore, the raceway 43 is formed by two mutually converging concave sections cooperating with the respective bodies 45.

Advantageously, the planet gear 9a comprises (FIG. 2) a pair of rings 50 and 51 axially opposite to each other and radially cooperating with the planet gear 9a so as to exert respective radial forces, with respect to axis B and directed towards axis B, on the planet gear 9a.

In this way, the rings 50 and 51 effectively create hoops around the planet gear 9a in the radial direction, which restrain any pieces that may separate from the planet gear 9a in the event of through cracks that form within the body 40.

The rings 50 and 51 do not exert axial forces parallel to axis B on the planet gear 9a.

More specifically, the rings 50 and 51 are mounted on the body 40 by interference fitting.

In the case shown, the rings 50 and 51 are shrunk mounted on the body 40.

Referring to FIGS. 1, 4 and 5, the planet gear 9a further comprises a pair of appendages 60 and 61, opposite to each other and axially projecting in a cantilever fashion from respective mutually opposite sides of the body 40.

Each appendage 60 and 61 comprises:

- a respective annular surface 62 and 63 defining a radially outer side of the appendage 60 and 61;
- a respective annular surface 64 and 65 defining a radially inner side of the appendage 60 and 61; and
- a respective rim 66 and 67 projecting from a respective annular surface 62 and 63 in a radial direction and from the side opposite to axis B.

Each appendage 60 and 61 defines a respective annular seat 70 and 71 for a respective ring 50 and 51.

Each seat 70 (71) is radially delimited by the associated annular surface 62 (63) and is axially delimited by the body 40 and by the associated rim 66 (67) facing each other.

In greater detail, the rings 50 and 51 have respective radially inner surfaces 52 and 53 that radially cooperate with and are radially forced against the respective annular surfaces 62 and 63.

The rings 50 and 51 also comprise respective axial side surfaces 54 and 55, opposite to each other. Surfaces 54 and 55 cooperate axially, from their opposite sides, with the body 40 and the associated rim 66 and 67.

The rims 66 and 67 axially restrain the associated rings 50 and 51.

The rings 50 and 51 also comprise respective radially outer side surfaces 56 and 57.

The surfaces 56 and 57 are opposite to the respective surfaces 52 and 53 and are arranged radially inwards with respect to the radially innermost fillet radius 49 of the teeth 13.

The planet gear 9a also comprises (FIGS. 3 to 5) a further pair of rings 75 and 76, axially opposite to each other and also cooperating with the body 40 of the planet gear 9a.

The rings 75 and 76 are adapted to exert respective forces on the planet gear 9a. These forces are directed radially to axis B and away from axis B.

In particular, the rings 75 and 76 are mounted on the body 40 by interference fitting.

In the case shown, the rings 75 and 76 are shrunk mounted on the body 40.

In greater detail, the rings 75 and 76 comprise respective radially outer side surfaces 81 and 82 cooperating with corresponding surfaces 64 and 65 of respective appendages 60 and 61.

Surfaces 64 and 65 are opposed to respective surfaces 62 and 63 radially to the axis A.

Surfaces 64 and 65 also axially cooperate with respective shoulders 79 and 80 defined by the body 40 and by respective appendages 60 and 61 on the side radially opposite to the respective seats 70 and 71.

The rings 75 and 76 are adapted to ensure the alignment of separate pieces of the planet gear 9a in the event of through cracks forming and causing the planet gear 9a, 9b to break into one or more pieces.

The raceway 41 is radially interposed between the appendages 60 and 61.

The thickness of rings 75 and 76 radially to axis B is preferably less than the thickness of rings 50 and 51 radially to the axis B.

In use, the transmission 5 transmits motion from the turbines 10 to the drive shaft 11 of the rotor 4.

In greater detail, power enters the epicyclic train 6 via the sun gear 7, which rotates about axis A, and is output via the planet-gear carrier 30, connected to the aforementioned drive shaft 11 of the rotor 4.

Since the planet gears 9a, 9b, 9c, 9d and 9e also mesh with the fixed ring gear 8, via teeth 13 and 14 (FIG. 3), rotation of the sun gear 7 causes rotation of the planet gears 9a, 9b, 9c, 9d and 9e about their axes B and the revolution of the planet gears 9a, 9b, 9c, 9d and 9e around axis A.

More specifically, the planet gears 9a, 9b, 9c, 9d and 9e rotate about the relative axis B with respect to the corresponding tubular elements 33 of the planet-gear carrier 30. In particular, this relative rotation of the planet gears 9a, 9b, 9c, 9d and 9e with respect to the tubular elements 33 takes place thanks to the rolling bodies 45 interposed between the raceways 41 and 43 and rolling on the raceways 41 and 43.

The planet gears 9a, 9b, 9c, 9d and 9e also describe a revolutionary movement around axis A integrally with the planet-gear carrier 30.

The rotation of the planet-gear carrier 30 transmits power, at the appropriate rotational speed, to the drive shaft 11 of the rotor 4.

Fatigue stress can generate cracks in the planet gears 9a, 9b, 9c, 9d and 9e.

In the case where the propagation of such cracks causes one of the planet gears 9a, 9b, 9c, 9d and 9e to break into two or more separate pieces, the radial force exerted by rings 50 and 51 and directed towards the associated axes B substantially reduces the risk of detachment of the aforementioned separate pieces.

Each pair of rings 75 and 76 exerts respective radial forces on the respective planet gears 9a, 9b, 9c, 9d and 9e directed away from axis B.

In this way, in the event of one of the planet gears 9a, 9b, 9c, 9d and 9e breaking into two or more separate pieces, the forces exerted by the respective rings 75 and 76 together with the action of the rims 66 and 67 keeps these pieces substantially parallel to a direction radial to axis B. The risk that one of these separate pieces passes over the rings 50 and 51 and can break away from the rest of the planet gear 9a, 9b, 9c, 9d and 9e at high speed is thus substantially reduced.

The same containment action occurs in the case where propagation of the crack does not cause one of the planet gears 9a, 9b, 9c or 9d to break into two separate parts.

From examination of the aircraft 1 according to the present invention, the advantages that can be achieved therewith are evident.

In particular, the planet gears 9a, 9b, 9c, 9d and 9e comprise respective pairs of rings 50 and 51 axially opposite to each other and exerting a radial force on the planet gears 9a, 9b, 9c, 9d and 9e.

In this way, in the event of propagation of a through crack resulting in one of the planet gears 9a, 9b, 9c, 9d and 9e breaking into two pieces, the radial forces exerted by rings 50 and 51 and directed towards axis A prevent detachment of the planet gear from the remaining part of the epicyclic train 6. It should be stressed that this risk of propagation of a through crack is particularly relevant in planet gears 9a, 9b, 9c, 9d and 9e, which in addition to normal fatigue loads deriving from meshing with the sun gear 7 and the ring gear 8 are also stressed by further fatigue loads deriving from Hertzian contact with the rolling bodies 45.

As a consequence, the risk that these separate pieces are projected inside the transmission 5 and can jam in a position interfering with the other members of the transmission 5 is substantially reduced. The risk of the transmission 5 jamming and losing function, with the consequent risk for the safety of the crew of the aircraft 1, is thus substantially reduced.

Each planet gear 9a, 9b, 9c, 9d and 9e further comprises a pair of rings 75 and 76 axially opposite to each other, cooperating with the associated planet gear 9a, 9b, 9c, 9d and 9e, and exerting respective forces on the planet gear 9a, 9b, 9c, 9d and 9e directed radially to axis B and away from axis B.

In this way, in the event of one of the planet gears 9a, 9b, 9c, 9d and 9e breaking into two or more pieces, the forces exerted by the respective rings 75 and 76 together with the action of rims 66 and 67 keeps these pieces substantially parallel in a direction radial to axis B.

The risk that one of these separate pieces passes over the rings 50 and 51 and can break away from the rest of the planet gear 9a, 9b, 9c, 9d and 9e at high speed is thus substantially reduced.

This further raises the tolerance level of the transmission 5 to the propagation of through cracks within one or more planet gears 9a, 9b, 9c, 9d and 9e.

Finally, it is clear that modifications and variants can be made regarding the previously described aircraft 1 without departing from the scope of the present invention.

In particular, the rings 50 and 51 and/or 75 and 76 could be applied to the sun gear 7 and/or ring gear 8 instead of to the planet gears 9a, 9b, 9c, 9d and 9e. Alternatively, the rings 50 and 51 and/or 75 and 76 could be applied both to the planet gears 9a, 9b, 9c, 9d and 9e and the sun gear 7 and/or the ring gear 8.

Furthermore, the ring gear 8 of the epicyclic train 6 could be rotatable about the axis A with a different angular speed from that of the sun gear 7.

Furthermore, the mechanical power could enter the epicyclic train 6 via the planet-gear carrier 30 and be output via the sun gear 7, with the correct torque value and rotational speed.

Furthermore, the transmission 5 could comprise two or more epicyclic trains 6 in series or in parallel with one another.

Furthermore, the transmission 5 could be at least partially integrated in one of the turbines 10.

Finally, the transmission 5 and the epicyclic train 6 could be employed in a convertiplane, a gyrodyne, or a remotely-piloted hover-capable aircraft, commonly referred to as a UAV.

The invention claimed is:

1. A hover-capable aircraft (1), comprising:
   at least one drive unit (10);
   at least one rotor (3, 4); and
   a transmission (5) interposed between said drive unit (10) and said rotor (3, 4);
   said transmission (5) comprising at least one gear (9a, 9b, 9c, 9d, 9e);
   said gear (9a, 9b, 9c, 9d, 9e), in turn, comprising a main body (40) rotatable about a first axis (B) and a plurality of first teeth (13) projecting in a cantilever fashion from said main body (40);
   characterized in that said gear (9a, 9b, 9c, 9d, 9e) comprises a first pair of first rings (50, 51) axially opposite to each other and cooperating with said gear (9a, 9b, 9c, 9d, 9e) so as to exert a radial force on the gear (9a, 9b, 9c, 9d, 9e) directed towards said first axis (B);
   said first rings (50, 51) being mounted on said body (40) by interference fitting;
   each said gear (9a, 9b, 9c, 9d, 9e) comprising a pair of second rings (75, 76) axially opposite to each other and cooperating with said gear (9a, 9b, 9c, 9d, 9e) so as to exert respective radial forces directed away from said first axis (B);
   wherein said gear (9a, 9b, 9c, 9d, 9e) comprises a pair of appendages (60, 61) axially projecting in a cantilever fashion from said body (40);
   said first rings (50, 51) being forced onto respective said appendages (60, 61);
   wherein each said appendage (60, 61) is radially interposed between an associated first ring (50, 51) and a corresponding second ring (75, 76);
   wherein each said second ring (75, 76) comprises a respective sixth radially outer side surface (81, 82) with respect to said first axis (B) and cooperating with a corresponding said second surface (64, 65) of a respective said appendage (60, 61).

2. The aircraft according to claim 1, characterized in that said first rings (50, 51) are radially forced onto said gear (9a, 9b, 9c, 9d, 9e).

3. The aircraft according to claim 1, characterized in that said appendages (60, 61) define respective seats (70, 71) engaged by respective said first rings (50, 51).

4. The aircraft according to claim 3, characterized in that each said appendage (60, 61) comprises:
   a respective first annular surface (62, 63) defining a radially outer side of the appendage (60, 61);
   a respective second annular surface (64, 65) defining a radially inner side of the appendage (60, 61); and
   a respective rim (66, 67) projecting from said first surface (62, 63) in a radial direction and on the side opposite to said first axis (B);
each said appendage (60, 61) defining an associated said seat (70, 71) for a respective said first ring (50, 51);
each said seat (70, 71) being radially delimited by said first surface (62, 63), and being axially delimited by said body (40) and by the associated said rim (66, 67);
each said first ring (50, 51) comprising:
   an associated third surface (52, 53) defining a radially inner side, which radially cooperates with a respective said first surface (62, 63) of a respective said appendage (60, 61); and
   respective fourth surfaces (54, 55) defining respective axial ends opposite to each other, which are interposed between said body (40) and the associated said rim (66, 67).

5. The aircraft according to claim 4, characterized in that each said first ring (50, 51) comprises an associated fifth surface (56, 57) opposite to the associated said third surface (52, 53);
   said associated fifth surface (56, 57) being arranged radially inwards with respect to radially innermost fillet radius (49) of said teeth (13).

6. The aircraft according to claim 5, characterized in that said first and second rings (50, 51; 75, 76) respectively have a first and a second thickness radially to said first axis (B);
   said second thickness being less than said first thickness.

7. The aircraft according to claim 1, characterized in that said second rings (75, 76) are radially opposed to respective said first rings (50, 51).

8. The aircraft according to claim 1, characterized in that each said appendage (60, 61) is radially interposed between an associated first ring (50, 51) and a corresponding second ring (75, 76).

9. The aircraft according to claim 1, characterized in that each said second ring (75, 76) is radially forced onto said gear (9a, 9b, 9c, 9d, 9e).

10. The aircraft according to claim 1, characterized in that said transmission (5) comprises an epicyclic train (6) formed by:
    a sun gear (7) rotatable about a second axis (A) with a first angular speed and comprising a plurality of second teeth (14);
    a ring gear (8) angularly fixed with respect to said second axis (A) or rotatable about said second axis (A) with a second angular speed different from said first angular speed and comprising a plurality of third teeth (12); and
    at least two said gears performing the function of respective planet gears (9a, 9b, 9c, 9d, 9e), each comprising a plurality of fourth teeth (13); said planet gears (9a, 9b, 9c, 9d, 9e) each meshing with said ring gear (8) and said sun gear (7), and being rotatable about respective said second axes (B), which in turn are rotatable about said first axis (A);
    a planet-gear carrier (30) comprising at least two pins (32) with respect to which said gears performing the functions of planet gears (9a, 9b, 9c, 9d, 9e) are rotatable about the respective said second axes (B).

11. The aircraft according to claim 1, characterized in that said body (40) of said gear (9a, 9b, 9c, 9d) defines a first rolling raceway (41), radially outermost with respect to said first axis (B), for a plurality of rolling bodies (45); said first raceway (41) being arranged on the side radially opposite to said first teeth (13).

12. The aircraft according to claim 11, characterized in that said transmission (5) comprises an epicyclic train (6) formed by:
    a sun gear (7) rotatable about a second axis (A) with a first angular speed and comprising a plurality of second teeth (14);
    a ring gear (8) angularly fixed with respect to said second axis (A) or rotatable about said second axis (A) with a second angular speed different from said first angular speed and comprising a plurality of third teeth (12); and at least two said gears performing the function of respective planet gears (9a, 9b, 9c, 9d, 9e), each comprising a plurality of fourth teeth (13); said planet gears (9a, 9b, 9c, 9d, 9e) each meshing with said ring gear (8) and said sun gear (7), and being rotatable about respective said second axes (B), which in turn are rotatable about said first axis (A);

a planet-gear carrier (30) comprising at least two pins (32) with respect to which said gears performing the functions of planet gears (9a, 9b, 9c, 9d, 9e) are rotatable about the respective said second axes (B); and wherein the planet-gear carrier (30) comprises at least two tubular elements (33) angularly integral with respective said pins (32) and defining respective second rolling raceways (43), radially innermost with respect to said first axis (B), for said rolling bodies (45).

\* \* \* \* \*